(12) United States Patent
de Geus et al.

(10) Patent No.: US 6,390,285 B2
(45) Date of Patent: May 21, 2002

(54) CONVEYOR SYSTEM FOR CONVEYING AND ACCUMULATING OBJECTS

(75) Inventors: Jacob Frank de Geus, Sint Pancras; Jacobus Gertrudus M. Paardekooper, Wassenaar; Hendrik Boele, Heerhugowaard, all of (NL)

(73) Assignee: Ammeraal International B.V., Heerhugowaard (NL)

( * ) Notice: Subject to any disclaimer, the term of this patent is extended or adjusted under 35 U.S.C. 154(b) by 0 days.

(21) Appl. No.: 09/751,923

(22) Filed: Dec. 29, 2000

Related U.S. Application Data

(63) Continuation of application No. PCT/NL99/00142, filed on Mar. 16, 1999.

(30) Foreign Application Priority Data

Mar. 20, 1998 (NL) .............................................. 1008654
Feb. 10, 1999 (NL) .............................................. 1011264

(51) Int. Cl.[7] .............................................. B65G 19/26
(52) U.S. Cl. ...................................... 198/732; 198/853
(58) Field of Search ............................. 198/474.1, 732, 198/850, 853

(56) References Cited

U.S. PATENT DOCUMENTS

| | | | | |
|---|---|---|---|---|
| 3,694,999 A | | 10/1972 | Switliski et al. | |
| 3,812,955 A | * | 5/1974 | Kopp | |
| 3,973,668 A | | 8/1976 | Stansfield | |
| 4,126,219 A | | 11/1978 | Bross | |
| 4,206,708 A | | 6/1980 | Behle | |
| 4,417,653 A | * | 11/1983 | Zwezerynen | |
| 4,505,093 A | * | 3/1985 | Johnson | |
| 4,890,724 A | * | 1/1990 | Loewenthal | |
| 5,501,318 A | * | 3/1996 | Disrud | |
| 5,706,934 A | | 1/1998 | Palmaer et al. | |

FOREIGN PATENT DOCUMENTS

| | | |
|---|---|---|
| DE | 1 024 428 | 6/1953 |
| WO | WO 94/03383 | 2/1994 |

* cited by examiner

*Primary Examiner*—James R. Bidwell
(74) *Attorney, Agent, or Firm*—Michael Best & Friedrich LLP; Teresa J. Welch; Jeffrey D. Peterson

(57) ABSTRACT

Disclosed is a conveyor system for conveying objects along a conveyor path. The system permits conveyance of objects along an inclined path and accumulation of objects. The system comprises a modular, plastic, endless conveyor belt comprising plastic modules linked by means of a connecting pin, accumulation elements for accumulating objects provided in at least some of the modules. Accumulation elements are driver members positionable beneath the conveyor belt's carrying section surface (accumulation position) or above the conveyor belt's carrying section surface (driving position), and a guidance system disposed beneath the driver member path for position driver members in driving position.

12 Claims, 3 Drawing Sheets

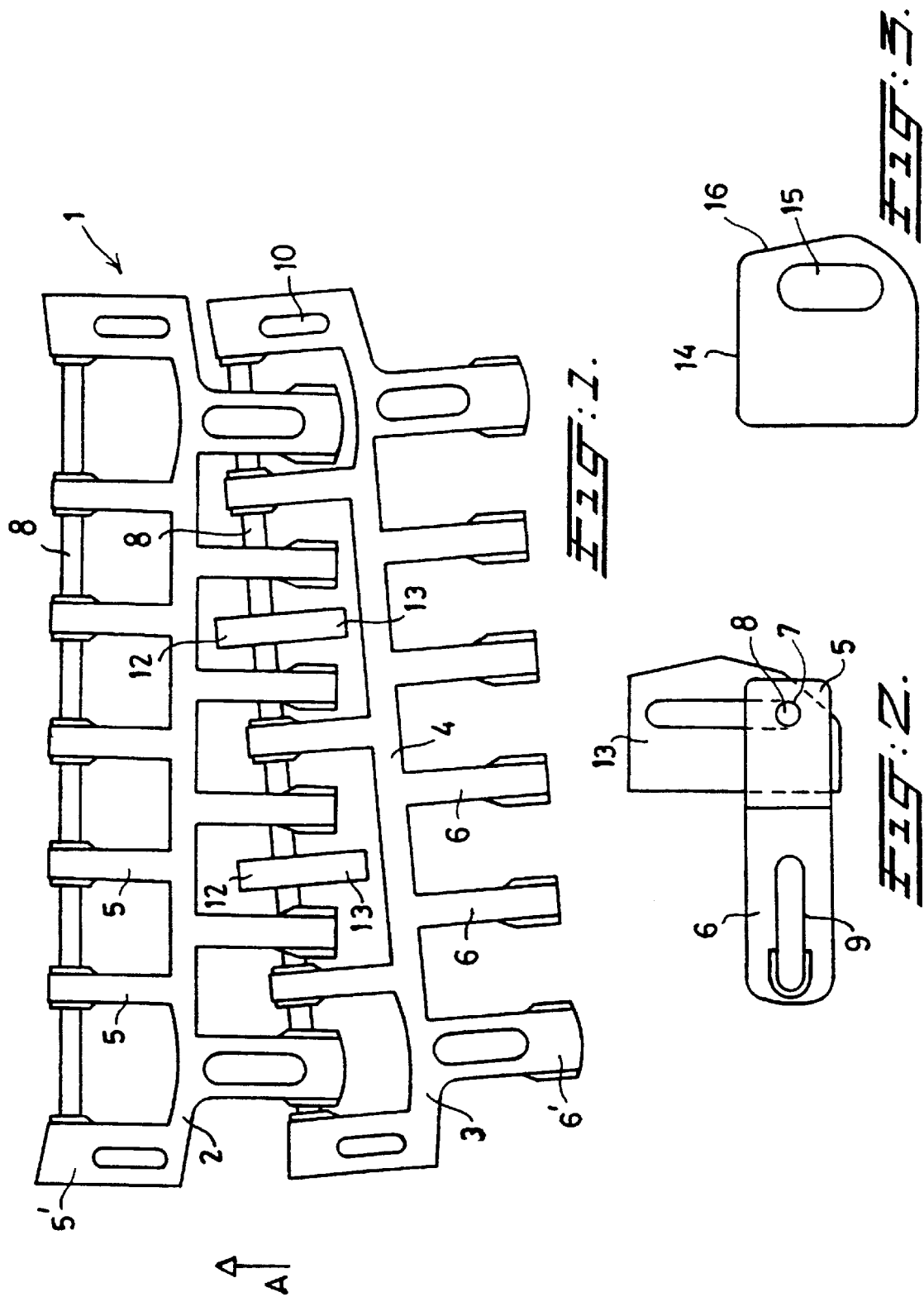

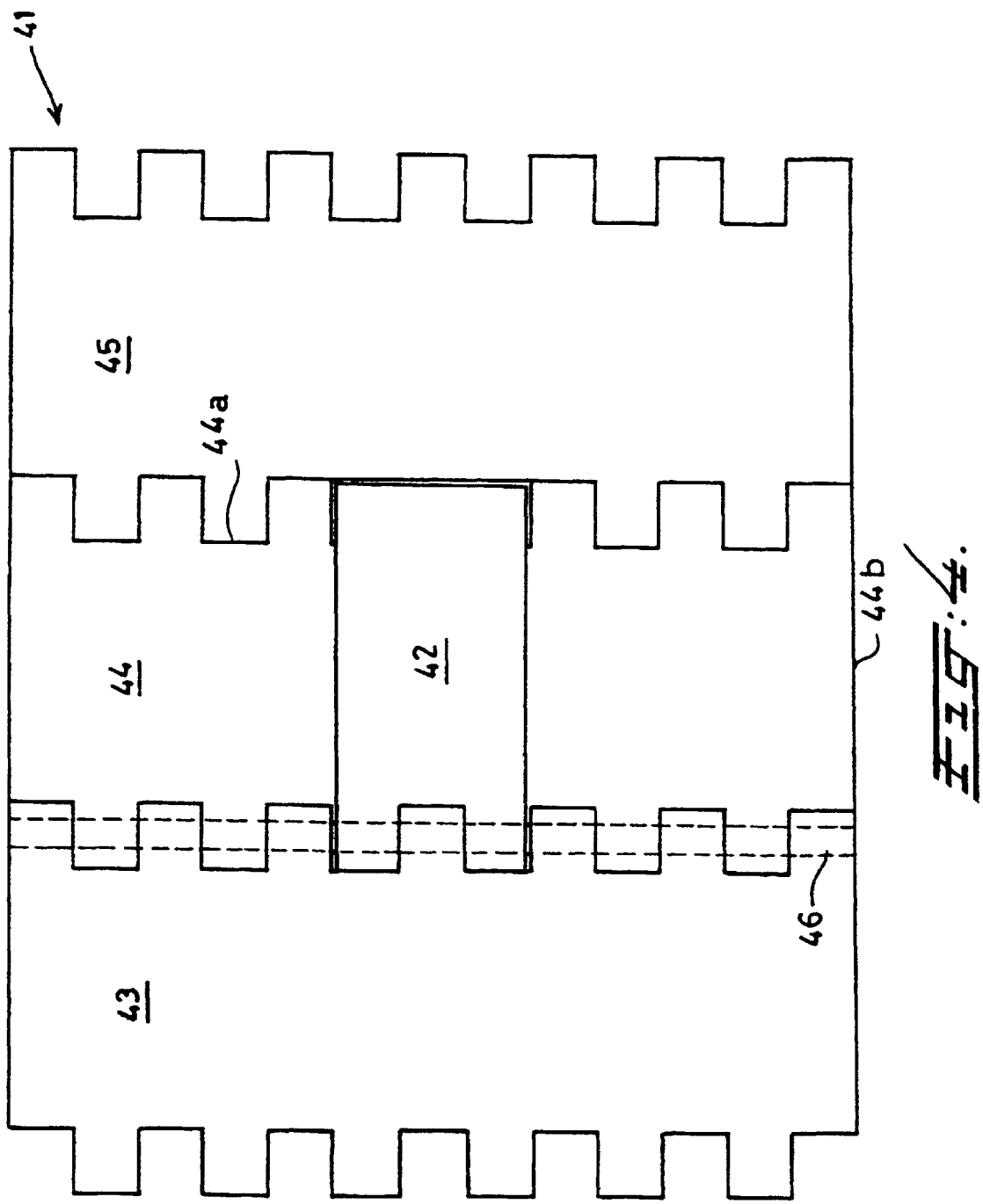

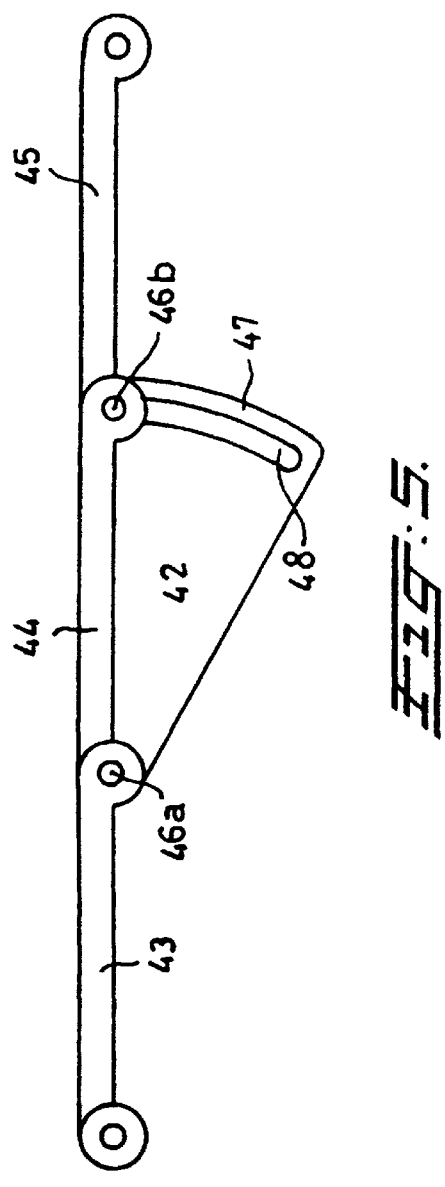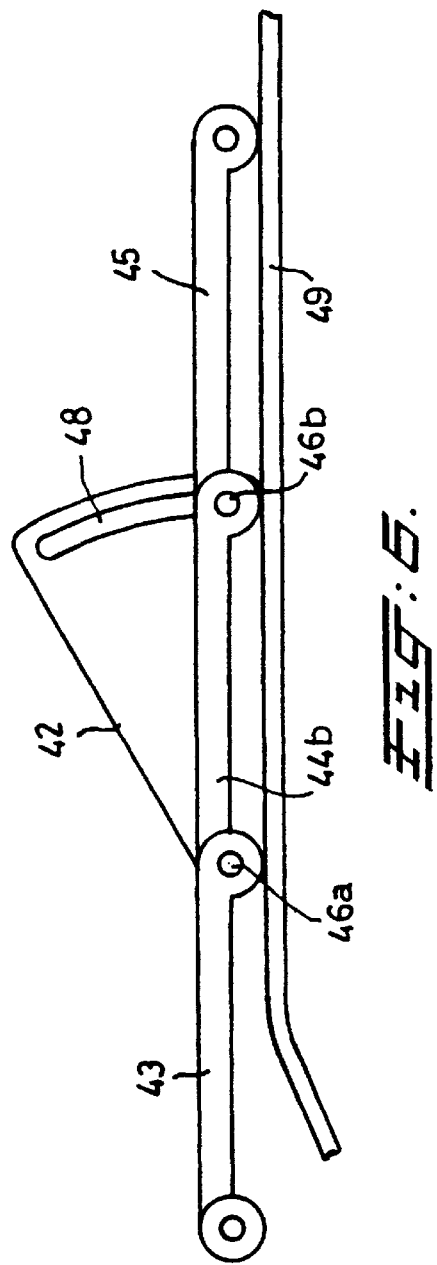

CONVEYOR SYSTEM FOR CONVEYING AND ACCUMULATING OBJECTS

CROSS-REFERENCE TO RELATED APPLICATIONS

This is a continuation application of PCT/NL99/00142 filed on Mar. 16, 1999.

FIELD OF THE INVENTION

The present invention relates to a conveyor system for conveying objects along a conveyor path according to the preamble of claim 1. The present invention relates in particular to a conveyor system which is suitable for conveying objects along an inclined conveyor path and for accumulating the objects, such as optionally packaged food products and foodstuffs, in which case the products may, if desired, be subjected to a treatment, for example a temperature treatment or a treatment involving liquid, during the conveyance.

BACKGROUND OF THE INVENTION

A conveyor system with modular conveyor belt, also known as chain-link belt, of this nature is known in the prior art. An example of such a system is described in WO 94/03383. This known belt, which is intended only for accumulation purposes, comprises chain-link modules which comprise a main body which runs transversely to the longitudinal axis of the belt and is provided with first and second side limbs, which extend in opposite directions transversely to the main body, i.e. projections which extend forwards and backwards as seen in the direction of movement of the belt. The first and second side limbs are provided with continuous openings through which a pivot pin or connecting pin is inserted in order to link together two adjacent modules, the second side limbs of a first module and the first side limbs of a following module being rotatably attached to the common pivot pin or connecting pin, which may comprise a plurality of parts. According to the invention described in WO 94/03383, the first or second side limbs are omitted or removed at a number of positions. At those positions, rolls are arranged rotatably on the pin, so that the belt can be used as an accumulating belt, since the products conveyed are subject to less counterpressure at the location of the rolls. In this way, the belt can be used to reduce the distance between products which are placed in succession on the belt. Objects are accumulated, for example, when packing a number of articles, which are fed onto a conveyor belt in succession and at a distance from one another, into a box. Accumulation can be carried out, for example, by retaining an object which arrives by means of a suitable retaining means, such as an arm which can move up and down, and after a certain number of objects have been retained in this way, these objects are then allowed through by removing the retaining means from the path of the objects, after which the accumulation cycle begins again. According to a particular embodiment of the known conveyor belt, the openings for the axis in either the first or the second side limbs of a module are in the form of a slot which extends in the longitudinal direction of the belt, so that the belt is also suitable for conveyor paths which are not straight. A drawback of an accumulating belt of this nature is that it is not suitable as an elevating belt with which the objects are conveyed along an inclined path, either downwards or upwards, such as for example along a helical path.

Conveyor belts which are provided with fixed or flexible driver members are also known in the prior art. Conveyor belts of this nature are suitable as elevating belts, with which objects are conveyed from a certain level to a higher level or vice versa. A drawback of these known belts with fixed or flexible driver members is that these driver members make it difficult to transfer objects which are situated on the belt onto another belt or the like by means of a fixed or movable sweeper arm, or even make such an operation entirely impossible. These known elevating belts also cannot be used as accumulating belts.

Conveyor belts for conveying objects along an inclined linear path are also known, which conveyor belts are provided with driver members which can move with respect to the carrying surface of the conveyor belt but which driver members are always in a driving position, i.e. project above the carrying surface, under the influence of a counterweight or suitable spring action, unless an object to be conveyed is pressing upon the driver member. Examples of conveyor systems of this nature are known from DE-B-1,024,428, in which the driver members in the inactive position form the carrying surface, and from U.S. Pat. No. 3,694,999, in which the driver members are used as spacer means for accurately adapting the position of boxes and lids which are to be placed on these boxes to one another.

Furthermore, U.S. Pat. No. 4,206,708 discloses a conveyor system which is intended to convey baggage conveyor cars next to an escalator or travolator. This system comprises linked-together, movable carriers, so-called "pallet cars", which act as the carrier for the baggage conveyor cars. This system is driven via a chain which is connected to the main drive of the escalator. Arc-shaped drivers, which are rotatably attached to an axle of the pallet cars, are provided on the underside of the cars, one end of the arc-shaped drivers being able to move through a slot-like opening in the bottom of the cars. For this purpose, the other end is provided with a rotatable roll which can be supported by a guide in order to allow the other end of the driver to engage behind a hook of a baggage conveyor car which is to be conveyed. A system of this nature is not intended to be and is not suitable as an accumulating belt. This structure comprises a relatively great number of large components, such as the reversing drums, making the system complex and such that it requires a large amount of space. A further drawback is that the noise levels will be high owing to the large number of rotating components and the materials employed.

SUMMARY OF THE INVENTION

The object of the invention is to provide a conveyor system with a modular conveyor belt which can be used as an elevating belt and an accumulating belt, it being possible for the conveyed products, if desired, to be pushed off the conveyor belt sideways.

A further object is to provide a system of this nature which has a relatively simple design.

Yet another object is to provide a system of this nature which produces relatively little noise during use.

The conveyor system of the type according to the invention described above is characterized in that the accumulating elements are driver members which can be lowered beneath the surface of the carrying section of the conveyor belt and have a support surface for retaining the objects, which driver members can be displaced between a driving position, which lies above the surface of the carrying section of the conveyor belt, and an accumulation position, which lies beneath the surface of the carrying section of the conveyor belt, and the conveyor system furthermore comprises a guidance system, which is disposed beneath the path of the driver members, for positioning the driver members in the driving position.

In the conveyor system according to the invention, the driver members, of which there are usually a plurality arranged in a line transversely to the longitudinal direction of the conveyor belt, so that an object is supported at a number of positions by the support surfaces of the driver members, which arrangement of the driver members is repeated at regular intervals over the length of the belt, can be moved upwards out of the belt surface into a driving position in order to support products and to prevent them from slipping downwards when they are conveyed upwards or downwards along an inclined conveyor path. If the belt according to the invention is used as an accumulation belt, the driver members according to the invention can be lowered beneath the carrying section of the modules into an accumulating position, so that the products are no longer retained at the location of the driver members and in that area are subject to less counterpressure, so that accumulation (buffering) can take place. If the driver members have been lowered into the belt surface, the objects situated on the belt can also easily be removed therefrom using an optionally movable sweeper arm or comparable tool. The driver members can be moved upwards or lowered in a simple manner by the presence or absence of the guidance system which is disposed beneath the path of a driver member, for example a guide strip, with which the underside of a driver member is preferably in sliding contact in the driving position.

The chain-link belt used in the invention may be of the open type described in WO 94/03383, but is in no way limited to such a design. Conveyor belts of this nature are advantageous for wet applications in which the objects are treated with a liquid treatment medium during conveyance, since no liquid remains behind on the belt and the objects conveyed are readily accessible to the treatment medium. A modular conveyor belt with a closed carrying surface, as is known, for example, from U.S. Pat. No. 5,706,934, can in a similar way be made suitable for use in the conveyor system according to the invention.

The modular conveyor belt according to the invention is advantageously resistant to chemicals and can be used within a wide temperature range from (–40 to 150° C.). The belt is preferably made from plastics, such as polyethylene, polypropylene, polyester, nylon, acetal, etc. The guides of the guidance system are preferably made from high-density polyethylene. A plastic conveyor system according to the invention produced in this way, in which the driver members slide along a guide in the driving position, produces scarcely any sound and thus does not cause any noise pollution.

Advantageously, the driver member used according to the invention can be lowered vertically.

According to a preferred embodiment of the conveyor belt according to the invention, a driver member which can be lowered vertically comprises a plastic body with a vertical, slot-like transverse passage opening for attachment to a connecting pin or pivot pin. The dimensions of the body are adapted to the dimensions of the modules in question, and in particular the length is adapted to the length of the side limbs, the width is adapted to the distance between two side limbs which lie next to one another as seen in the transverse direction of the belt, either the distance between a first and a second side limb of two successive modules, if the conveyor belt has side limbs which engage alternately in one another, or the distance between two side limbs of the same type of a module, if the conveyor belt has side limbs which engage in one another in groups. The height of the body of the lowerable driver member will generally be adapted to the specific application of the conveyor belt. The height of the vertical, slot-like passage opening will be adapted to the total height of the driver member in order to ensure that when objects are being driven and elevated the driver members project sufficiently far upwards from the belt surface and can also be lowered sufficiently far into the surface to carry out accumulation. In this embodiment of the driver member, the latter moves only in the vertical direction.

Other forms of the slot-like transverse passage opening or openings, such as diagonal or curved, are also possible, in which case the shape of the body will be adapted to the movement path of the body with respect to the modules over the connecting pin or pivot pin, in order to prevent any obstacle to said movement from the main bodies of the modules.

With regard to the strength of the driver member and the attachment to a connecting pin, a preferred embodiment of a driver member comprises an injection-moulded block-shaped body. A further embodiment relates to a U-shaped body, the limbs of which are at a distance from one another in the transverse direction of the conveyor belt, and vertical, slot-like transverse openings are provided in both limbs.

In order to ensure that a product which bears against a driver member does not interfere with or prevent the free movement of the driver member, the support surface of the body is advantageously curved or bevelled upwards. In order to prevent the driver member from being blocked against a main body of a module, the front face is preferably also curved or bevelled downwards.

If the conveyor path for which the conveyor belt according to the invention is employed comprises curves or bends, the openings for the axis in one type of side limbs advantageously take the form of horizontal slots, as described in WO 94/03383, so that the separate modules can rotate slightly with respect to one another.

In order to provide further assistance with the function as accumulating belt, the conveyor belt may advantageously also be provided with rolls which are disposed so that they can rotate about a pin, in accordance with the abovementioned PCT application WO 94/03383.

In the case of modular conveyor belts with a closed carrying surface, such as for example those which are known from U.S. Pat. No. 5,706,934, which are intended for conveying along straight paths, it is advantageously possible to use a driver which can pivot about a connecting pin. Preferably, a driver of this nature comprises a body with a first transverse opening for pivotable attachment to a first connecting pin and a slot-like transverse opening for accommodating a following connecting pin in a displaceable manner, providing a strong and robust structure.

In the modules which are used in the system according to the invention, the distance between successive connecting pins is usually 2.54, 3.81 or 5.08 cm (1, 1.5 and 2 inches, respectively).

The invention also relates to a modular, plastic, endless conveyor belt for use in the conveyor system according to the invention, as defined in claim 11.

BRIEF DESCRIPTION OF THE DRAWINGS

The invention is explained below with reference to the appended drawing, in which:

FIG. 1 shows a diagrammatic plan view of an embodiment of a modular conveyor belt according to the invention;

FIG. 2 shows a side view of a module of the conveyor belt in accordance with FIG. 1;

FIG. 3 shows a side view of an embodiment of a driver member which is used in the conveyor belt according to the invention;

FIG. 4 shows a diagrammatic plan view of another embodiment of a modular conveyor belt according to the invention;

FIG. 5 shows a diagrammatic side view of the conveyor belt in accordance with FIG. 4, with the driver in the lowered position, and FIG. 6 shows a diagrammatic side view of the conveyor belt in accordance with FIG. 5 with the driver in the raised position.

DESCRIPTION OF THE PREFERRED EMBODIMENT

FIG. 1 shows a modular conveyor belt which is denoted overall by reference numeral 1. The conveyor belt 1 comprises interlinked modules, two of which, namely 2 and 3, are illustrated in FIG. 1. Each module comprises an elongate main body 4 with first side limbs 5, which extend in the direction of movement—indicated by arrow A—of the belt 1, and second side limbs 6, which extend in the opposite direction. Since in a bend of the conveyor path, the greatest tensile and compressive forces are exerted on the outermost side limbs 5' and 6', these side limbs are designed to be thicker and therefore stronger than the other side limbs. Transverse openings 7 (cf. FIG. 2), in which a pivot pin 8 is mounted, are arranged in the first side limbs 5. The second side limbs 6 are provided with horizontal slots 9, so that the modules 2 and 3 which are linked together with the aid of pin 8 are able to rotate slightly in the longitudinal plane with respect to one another, as illustrated. Openings 10 in the modules are intended, if necessary, to accommodate side plates (not shown) which prevent objects which are being conveyed from being able to fall off the belt.

In the embodiment illustrated in FIG. 1, module 3 has a different form from module 2. Two first side limbs 5 are omitted during manufacture of module 3 or are subsequently removed by sawing or some similar action. Driver members 13 which can be lowered are attached to the pin 8 in the spaces 12 formed. The belt can be driven by means of toothed wheels (not shown), the teeth of which project into the spaces 12. If these driver members are supported by a guide (not shown in FIG. 1), they are pressed upwards until they are above the carrying surface of the belt 1 (cf. FIG. 2), so that the belt 1 can be used as an elevating belt in which the upwardly projecting driver members 13 drive the objects. If the driver members 13 are not supported, their own weight will cause them to sink back down, so that the top side of the driver members is situated below the carrying surface of the belt.

FIG. 3 shows a preferred embodiment of a driver member 13. A driver member 13 of this nature comprises a body 14 in the form of a block, in which a vertical, slot-like transverse opening 15 is arranged, through which a pin 8 can project. From the centre, the support surface 16 of the body 14 is bevelled upwards and rounded downwards. This further increases the freedom of movement of the driver member 13.

FIGS. 4–6 show another embodiment of a conveyor belt 41 with pivotable drivers 42 according to the invention. Three modules 43–45 of the conveyor belt 41, which has a closed surface and is thus only suitable for conveying along straight paths, are shown, which modules are linked to one another in a known manner by means of connecting pins 46. The module 44 comprises two parts, 44a and 44b, respectively, which are attached at a distance from one another to the appropriate connecting pins 46, only one of which is shown in FIG. 4 by means of a dashed line. A driver 42 is pivotably attached to connecting pin 46a in the space between module parts 44a and 44b. A driver 42 of this nature comprises a body which is substantially in the form of an isosceles triangle, the vertex of which is provided with a continuous opening through the body for pivotable attachment to the connecting pin 46a and the rounded base 47 of which describes part of an arc of a circle (with the connecting pin 46a as the centre of the circle). A slot-like transverse opening 48 is arranged in the body, parallel to the base 47, in which opening the connecting pin 46b is pivotably accommodated. FIG. 5 shows the driver 42 in an accumulation position in which it is lowered into the carrying surface of the conveyor belt 41, while in FIG. 6 the driver 42 projects into a driving position above the carrying surface. This latter position is reached with the aid of a guide 49 which is situated beneath the path which is to be covered by the driver 42 along that section where the driver 42 is to be in the raised position, for example while objects are being guided upwards. In order to prevent a guide from blocking a downwardly directed driver member, the first end of the guide is bent downwards, so that a driver member is gradually moved from the accumulation position into the driving position.

What is claimed is:

1. Conveyor system for conveying objects along a conveying path, which is suitable in particular for conveying the objects along an inclined conveyor path and for accumulating the objects, comprising a modular, plastic, endless conveyor belt, which conveyor belt comprises plastic modules which are linked to one another and have a carrying section for carrying the objects, each module being provided with a number of projections which are spaced apart from one another and extend in the conveying direction, as well as with a number of projections which are spaced apart from one another and extend in the opposite direction, each projection being provided with a transverse opening for accommodating a connecting pin, connecting pins which extend through the transverse openings of adjacent projections of linked-together modules, as well as drive means for driving the conveyor belt, characterized by driver members in at least some of the modules, which driver members can be lowered beneath the surface of the carrying section of the conveyor belt and have a support surface for retaining the objects, and which driver members can be displaced between a driving position, which lies above the surface of the carrying section of the conveyor belt, and an accumulation position for allowing conveyed objects to accumulate, which lies beneath the surface of the carrying section of the conveyor belt; and the conveyor system furthermore comprises a guidance system, which is disposed beneath the path of the driver members, for positioning the driver members in the driving position.

2. Conveyor system according to claim 1, characterized in that a driver member can be lowered vertically.

3. Conveyor system according to claim 2, characterized in that the driver member comprises a body with a vertical, slot-like transverse opening, through which a connecting pin projects.

4. Conveyor system according to one of the preceding claims, characterized in that the driver member is a block shape with a slot-like transverse opening.

5. Conveyor system according to one of the preceding claims, characterized in that the driver member is a U-shaped body, the limbs of which lie in the transverse direction of the conveyor belt, at a distance from one another, and vertical, slot-like transverse openings, through which a connecting pin projects, are provided in both limbs.

6. Conveyor system according to one of the preceding claims, characterized in that the support surface of a driver member is bevelled upwards in order to retain an object.

7. Conveyor system according to one of the preceding claims, characterized in that the support surface of a driver member is rounded downwards.

8. Conveyor system according to claim 1, characterized in that a driver member can be pivoted about a connecting pin in order to link modules.

9. Conveyor system according to claim 8, characterized in that a driver member comprises a body with a first transverse opening for pivotable attachment to a first connecting pin, and a slot-like transverse opening which is in the form of an arc of a circle, for displaceably accommodating a following connecting pin therein.

10. Conveyor system according to one of the preceding claims, characterized in that the guidance system comprises plastic guides along which the driver members slide in the driving position.

11. Conveyor system according to one of the preceding claims, characterized in that the modules are made from acetal and the plastic guides are made from high-density polyethylene.

12. Modular, plastic, endless conveyor belt, in which the conveyor belt comprises plastic modules which are linked to one another and have a carrying section for carrying the objects, each module being provided with a number of projections which are spaced apart from one another and extend in the conveying direction, as well as with a number of projections which are spaced apart from one another and extend in the opposite direction, each projection being provided with a transverse opening for accommodating a connecting pin, connecting pins which extend through the tranverse openings of adjacent projections of linked-together modules, characterized by driver members in at least some of the modules which driver members can be lowered beneath the surface of the carrying section of the conveyor belt and have a support surface for retaining the objects, and which driver members can be displaced between a driving position, which lies above the surface of the carrying section of the conveyor belt, and an accumulating position for allowing conveyed objects to accumulate, which lies beneath the surface of the carrying section of the conveyor belt.

* * * * *